US006459940B1

(12) United States Patent
Ghorbel et al.

(10) Patent No.: US 6,459,940 B1
(45) Date of Patent: Oct. 1, 2002

(54) CLOSED-LOOP COMPENSATION FOR KINEMATIC ERROR IN HARMONIC DRIVER FOR PRECISION CONTROL APPLICATIONS

(75) Inventors: Fathi Ghorbel, Houston, TX (US); Prasanna S. Ghandi, Maharashtra (IN)

(73) Assignee: Wm. Marsh Rice University, Houston, TX (US)

( * ) Notice: Subject to any disclaimer, the term of this patent is extended or adjusted under 35 U.S.C. 154(b) by 0 days.

(21) Appl. No.: 09/566,163

(22) Filed: May 5, 2000

Related U.S. Application Data

(60) Provisional application No. 60/132,906, filed on May 6, 1999.

(51) Int. Cl.[7] ............................................. G05B 19/18
(52) U.S. Cl. ........................ 700/56; 700/170; 369/43
(58) Field of Search ............................ 700/170, 56, 28, 700/29, 37, 42, 45; 369/43, 44.27

(56) References Cited

U.S. PATENT DOCUMENTS

| | | | | |
|---|---|---|---|---|
| 4,457,165 A | * | 7/1984 | Wiederrich | 73/116 |
| 4,616,353 A | | 10/1986 | Kaneda et al. | 369/43 |
| 5,719,480 A | * | 2/1998 | Bock et al. | 318/561 |
| 5,971,091 A | | 10/1999 | Kamen et al. | 180/218 |
| 6,011,762 A | | 1/2000 | Watanabe et al. | 369/44.27 |
| 6,138,493 A | * | 10/2000 | Zeitlin | 73/1.01 |

* cited by examiner

*Primary Examiner*—Leo Picard
*Assistant Examiner*—Zoila Cabrera
(74) *Attorney, Agent, or Firm*—Conley, Rose & Tayon, P.C.

(57) ABSTRACT

Nonlinear control algorithms to compensate for kinematic error in harmonic drives provide a solid basis to improve their performance of harmonic drives in precision positioning applications. The present closed loop control algorithms compensate for kinematic error irrespective of its form in both set-point and trajectory tracking applications.

10 Claims, 8 Drawing Sheets

Nomenclature $J_m$ = Inertia on motor side
$J_l$ = Inertia on load side
$B_m$ = Damping on motor side
$B_l$ = Damping on load side
$K_p$ = Proportional gain
$K_d$ = Derivative gain
$\tilde{\theta}$ = Kinematic error
$\theta_l^r$ = Reference set-point
$N$ = Gear transmission ratio $Y = \frac{1}{N} - \frac{d\tilde{\theta}}{d\theta_m}$ $\tilde{\theta}'' = \frac{d^2\tilde{\theta}}{d\theta_m^2}$

Fig. 5

$Y = \frac{1}{N} - \frac{d\tilde{\theta}}{d\theta_m}$, $\tilde{\theta}'' = \frac{d^2\tilde{\theta}}{d\theta_m^2}$

Nomenclature $J_m$ = Inertia on motor side    $K_d$ = Derivative gain
$J_l$ = Inertia on load side    $\tilde{\theta}$ = Kinematic error
$B_m$ = Damping on motor side    $\theta_l^r$ = Reference set-point
$B_l$ = Damping on load side    $N$ = Gear transmission ratio
$K_p$ = Proportional gain

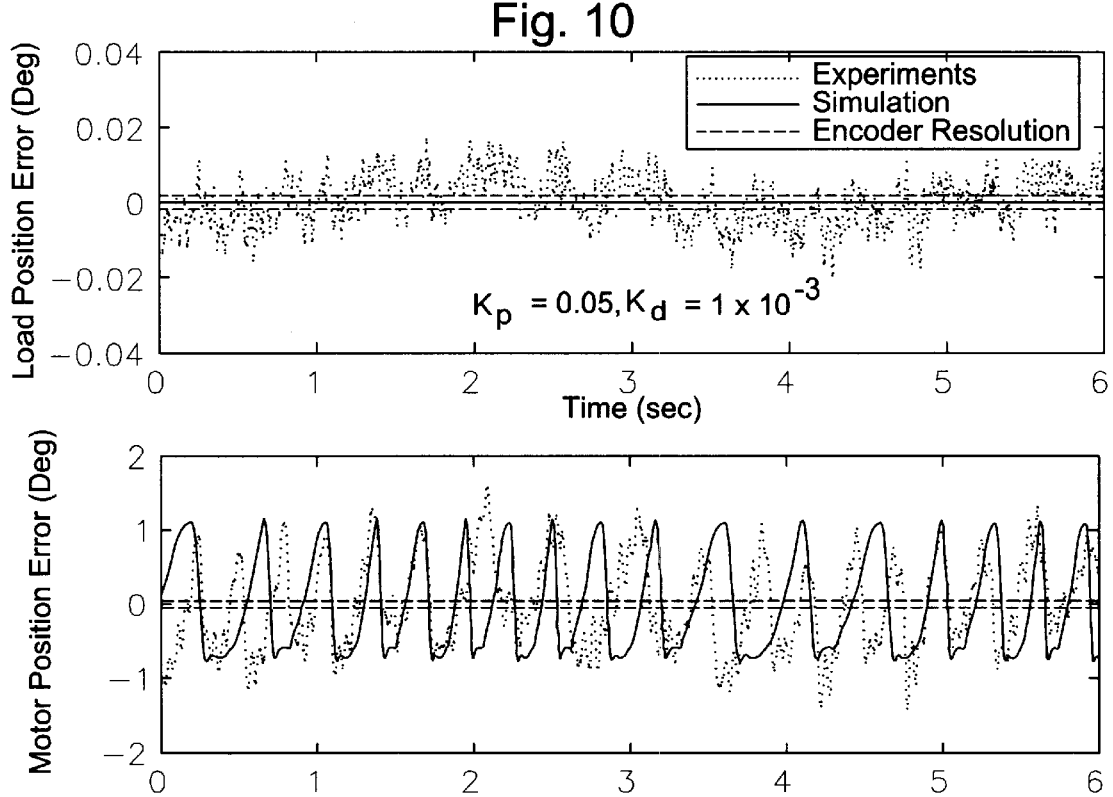
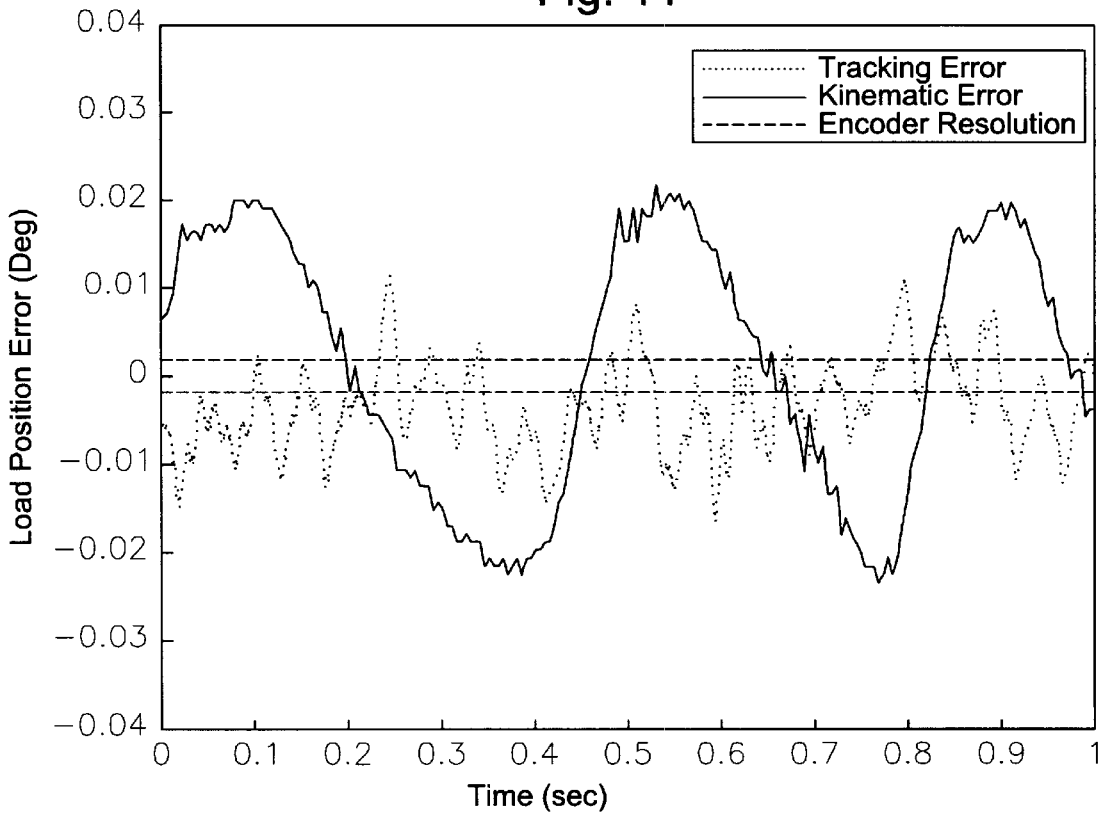

CLOSED-LOOP COMPENSATION FOR KINEMATIC ERROR IN HARMONIC DRIVER FOR PRECISION CONTROL APPLICATIONS

RELATED APPLICATIONS

This application claims the benefit of U.S. Provisional application Serial No. 60/132,906, filed May 6, 1999, and entitled "Closed Loop Compensation of Kinematic Error in Harmonic Drives for Precision Control Applications."

STATEMENT REGARDING FEDERALLY SPONSORED RESEARCH OR DEVELOPMENT

This work is partially funded by the National Science Foundation under Grant No. INT-9819869.

TECHNICAL FIELD OF THE INVENTION

The present invention relates generally to a precisely controlling a harmonic drive and more particularly to a system for compensating for kinematic error in harmonic drives. Still more particularly, the present invention relates to an error algorithm for harmonic drives that takes into account both static and dynamic components of kinematic error.

BACKGROUND OF THE INVENTION

Harmonic drives are special flexible gear transmission systems. A typical harmonic drive 10 as shown in FIG. 1, comprises a wave generator 12, a flexible race ball bearing (not shown), a flexible spline 14, and a circular spline 16. Wave generator 12 is a rigid steel core having an elliptical shape with a very small but non-zero eccentricity. Wave generator 12 is surrounded by the flexible race ball bearing. The flexible spline 14 (or "flexspline") is a thin-walled hollow cup preferably of alloy steel. External gear teeth 13 are machined at the open end of this cup and the closed end is connected to an output shaft. Circular spline 16 is a rigid internal gear having two teeth more than the number of teeth on flexspline 14. When assembled, wave generator 12 fits into the open end of the flexspline cup and gives it an elliptical shape at that end. The teeth of circular spline 16 then mesh with the flexspline teeth at the major axis of the ellipse defined by the wave generator. A fully assembled harmonic drive is shown in FIG. 2. In the most common speed reduction configuration, wave generator 12 serves as the input port, flexspline 14 acts as an output port, and circular spline 16 is held immobile.

This typical construction, with meshing at two diametrically opposite ends, gives harmonic drives many useful characteristics. These include compact design with less weight, higher gear reduction with almost zero backlash, and higher torque-to-weight ratio. Hence, these drives are popular in many precision positioning applications, such as in wafer handling machines in the semiconductor industry, in lens grinding machines, and in rotary adjustment mechanisms of reconnaissance cameras. Harmonic drives are also ideal for space robots because of their higher torque-to-weight ratio, which enables them to be directly mounted at robot joints. Additionally, they are widely used in precision measuring devices and in the semiconductor industry for laser mirror positioning.

The concept of harmonic drives was conceived and developed during the mid-1950s. Their industrial use in different applications has been growing since then. However, the research in the theoretical aspects of their transmission characteristics has not been extensive. Most of the work in this area has addressed nonlinear transmission attributes including kinematic error, flexibility, and hysteresis, and in design attributes including tooth stresses and geometry.

Of the different transmission attributes mentioned above, kinematic error is of foremost concern for precision positioning applications. The kinematic error $\theta_K$ is defined as the deviation between the expected output position and the actual output position. It is illustrated in FIG. 3 and given by the following equation $$\theta = \theta_m/N - \theta_{J_3} \quad (1)$$

where $\theta_m$ is the rotational position of the motor shaft attached to the wave generator, N is the gear reduction ratio, and $\theta_J$ is the rotational position of the output shaft connected to the flexspline or the circular spline as the case may be. The experimental kinematic error waveforms presented in the literature show small magnitude with periodic nature; for instance, the waveform shown in FIG. 4 is periodic with magnitude of 0.05 deg. Also, the fundamental frequency of these waveforms is reported to be twice the frequency of wave generator rotation. In addition to the fundamental error, small high frequency error components are observed. Besides producing a static error in load position, kinematic error acts as a periodic exciter and causes undesirable vibration effects. These vibrations serve as an energy sink and produce dramatic torque losses and velocity fluctuations. Thus, kinematic error has both static and dynamic effects, which lead to performance degradation in both precision regulation and tracking. Hence, compensation of kinematic error is of utmost importance for precision positioning with harmonic drives.

Properties of kinematic error and causes of its occurrence have been studied in the past by several researchers, but a complete characterization of kinematic error has been done only recently. As set out in "On the Kinematic Error in Harmonic Drive Gears", Ghorbel et al., which is appended hereto and incorporated herein in its entirety, it has been found that kinematic error differs for different drives, speeds, assemblies, and loading conditions. In particular, as motor speed is increased, the kinematic error waveform is colored by flexibility effects. This leads to the concept of a "pure form" of kinematic error. The pure form, defined at a low speed, varies as the load on output shaft is increased. Also, this form changes with the change in assembly conditions. In addition, kinematic error has been reported to be sensitive to the environmental conditions. Thus, compensation for this nonlinear, operating condition-dependent, drive-specific kinematic error poses a challenging task.

Heretofore, the complete compensation for kinematic error in set-point and trajectory tracking with harmonic drives not heretofore been achieved. One previous attempt to compensate for kinematic error constituted approximating the kinematic error with a simple sinusoid $$\bar{\theta} = A \sin 2\theta_m. \quad (2)$$

by neglecting the higher frequency components in the error and determining the trajectory to be traversed by the motor $\theta_m(t)$ was determined using equation (1) for a given load trajectory $\theta_l(t)$. Next, the motor position was controlled to follow the trajectory $\theta_m(t)$, thereby partially compensating for the kinematic error when the output tracked the trajectory $\theta_l(t)$. This scheme required prior knowledge of the error waveform, and it did not account for the error sensitivity to different factors mentioned above. This compensation can be considered open loop because no load side feedback is used.

The second previously known approach is an active compensation approach, which differs from the open loop approach described above in that the disturbance is injected as the current controller input to compensate for the error. Before implementing this scheme, the disturbance injection signal has to be calibrated based on the kinematic error profile, for which the measurement of acceleration at the output is used. Thus, this scheme, too, requires prior knowledge of the kinematic error in a different way. Additionally, once calibrated, this scheme does not ensure complete compensation if the assembly, loading or environmental conditions change. Thus, both these approaches seek to compensate for the error in an open loop sense, using the stored information of the kinematic error.

SUMMARY OF THE PRESENT INVENTION

The present invention includes the use of control algorithms in controllers to completely compensate for kinematic error without using prior information of the error. The present algorithms are based on a mathematical model that represents nonlinear dynamic effects of kinematic error in harmonic drives. A general form of kinematic error is assumed while deriving the equations of dynamics using the Lagrange formulation. With reference to this model, the present nonlinear control algorithms compensate completely for the kinematic error both in set-point and trajectory tracking.

The asymptotic stability of error dynamics equilibrium with the present controllers is demonstrated using the Lyapunov theory. Simulation and the experimental results obtained using a dedicated harmonic drive test setup verify the effectiveness of these controllers. The present controllers achieve the compensation task independent of the form of kinematic error and no prior information regarding the form is necessary. Instead, the present control scheme uses both load side and motor side feedback. Hence, the present compensation approach provides complete compensation irrespective of the error form, using a closed loop approach. This is in contrast to previous open loop approaches, which use only motor side feedback.

BRIEF DESCRIPTION OF THE DRAWINGS

In the detailed description of the preferred embodiments of the present invention that follows, reference is made to the Figures, wherein:

FIGS. 5 and 6 are schematic diagrams of control systems for set-point control and tracking control, respectively, of harmonic drive systems.

FIG. 10 is two plots of errors in trajectory-tracking control of load position output of a harmonic drive constructed in accordance with the present invention; and FIG. 11 is a plot comparing errors in steady state tracking of load position output to kinematic error for a harmonic drive constructed in accordance with the present invention.

DETAILED DESCRIPTION OF A PREFERRED EMBODIMENT

Dynamic Model of a Harmonic Drive Test Setup

This section presents a mathematical model of a dedicated harmonic drive test setup developed in accordance with the present invention. In addition, the properties of this model that are important from a control perspective are presented. Since the focus of this work is the kinematic error, it is represented in its most general form $\theta_k = \theta_k(\theta_m)$, and the flexibility and friction effects are neglected while deriving the equations that govern the system dynamics. The experimental conditions are tailored to compensate for omission of flexibility and friction from mathematical model. In particular, the static friction effects are compensated for by using a Coulomb friction model, and unidirectional motion with slow speeds is maintained in all the experiments.

Figure 1:
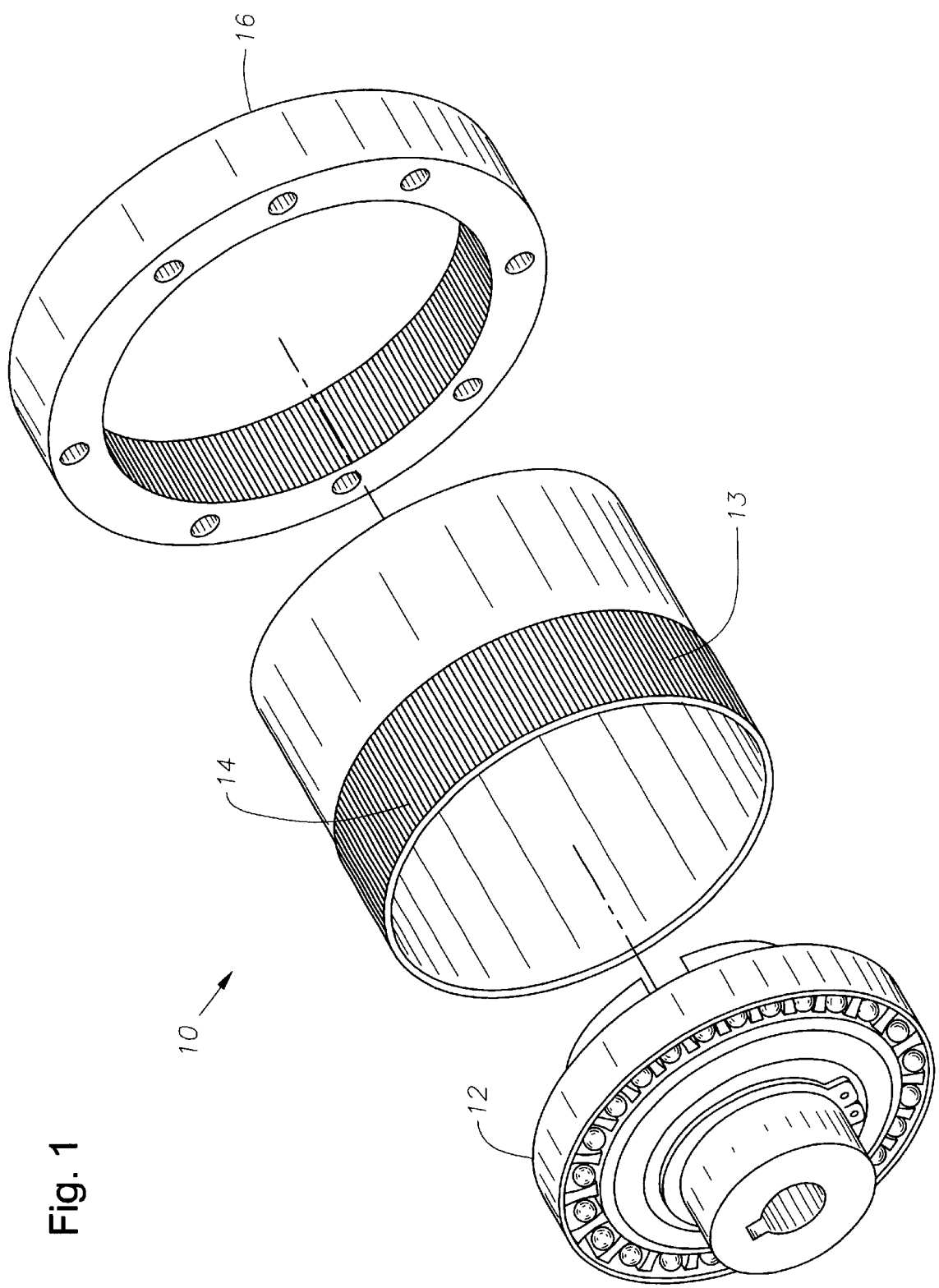
FIG. 1 is an exploded isometric view of a conventional harmonic drive.
Figure 2:
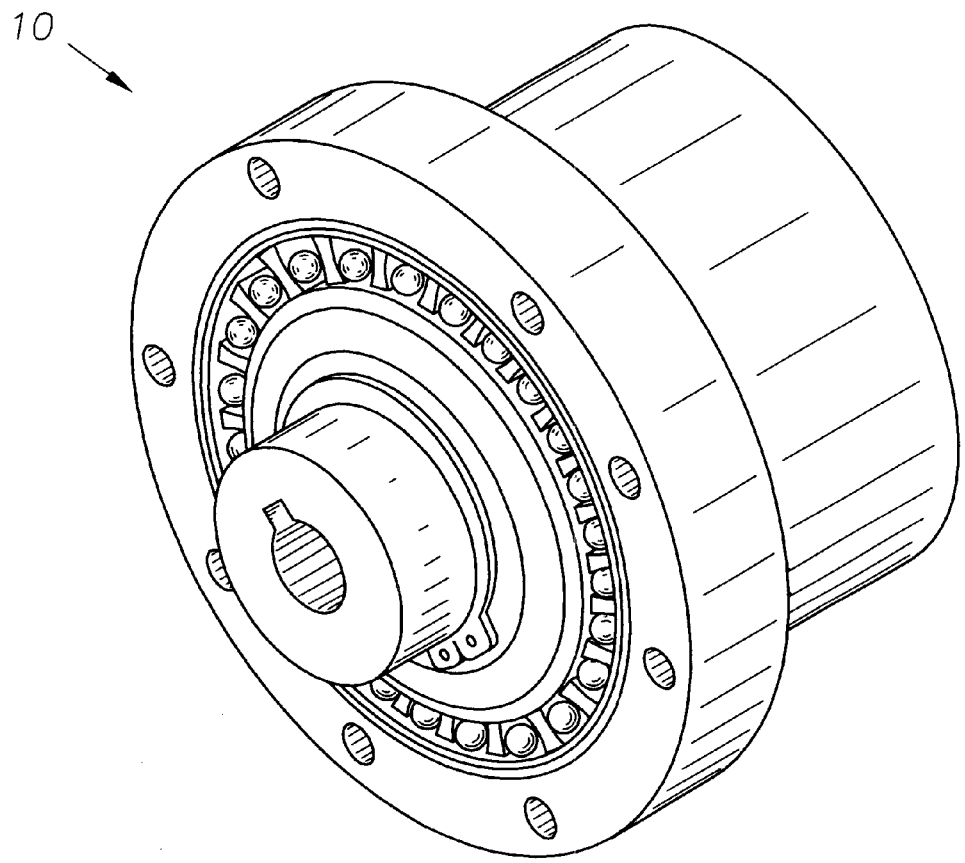
FIG. 2 is an isometric view of an assembled conventional harmonic drive.
Figure 3:
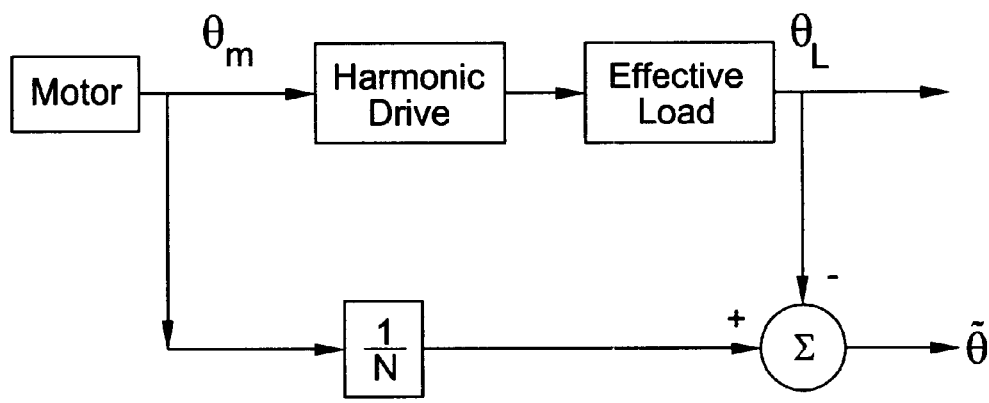
FIG. 3 is a schematic diagram illustrating Equation (1)
Figure 4:
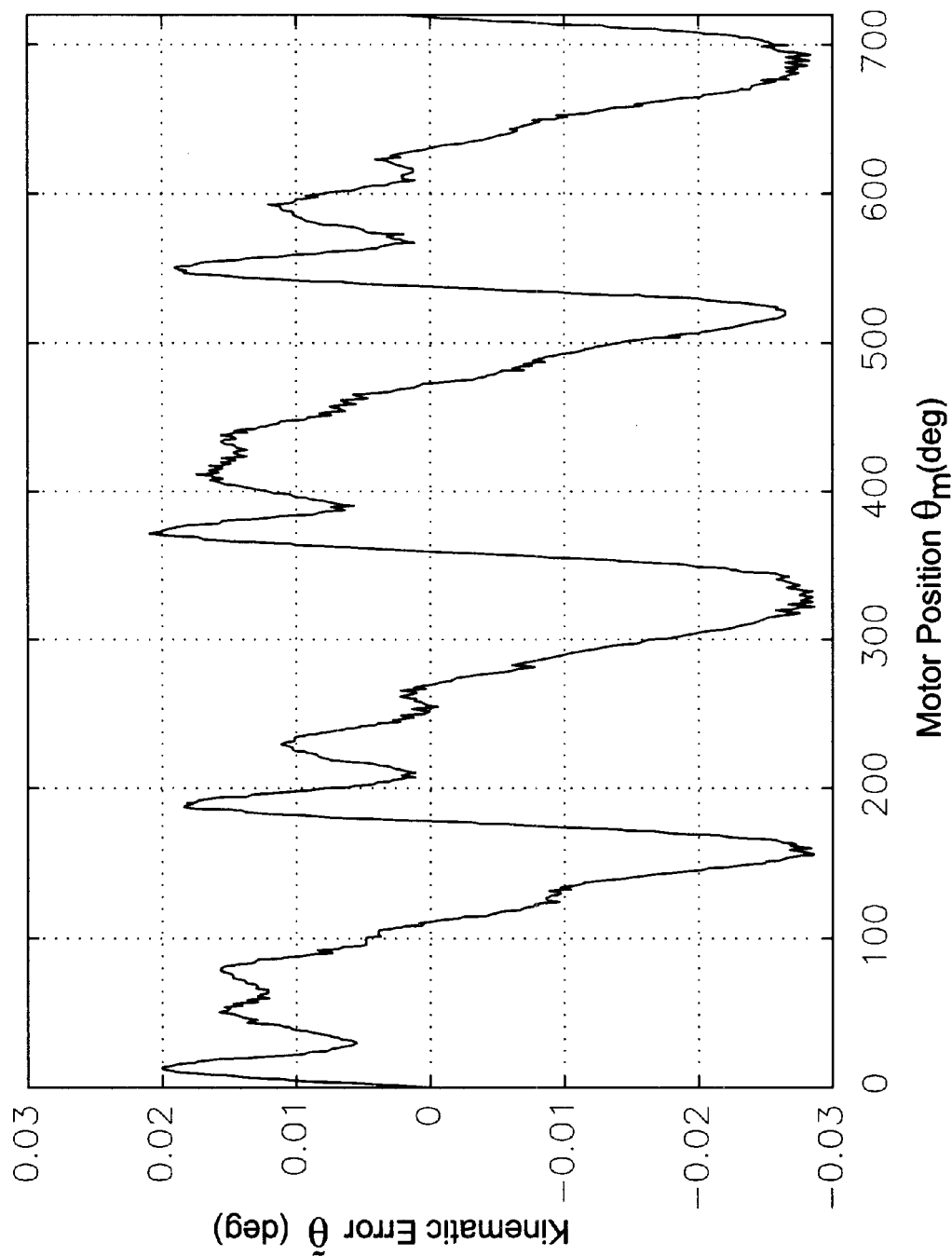
FIG. 4 is a plot of kinematic error in a conventional harmonic drive system.
Figure 6:
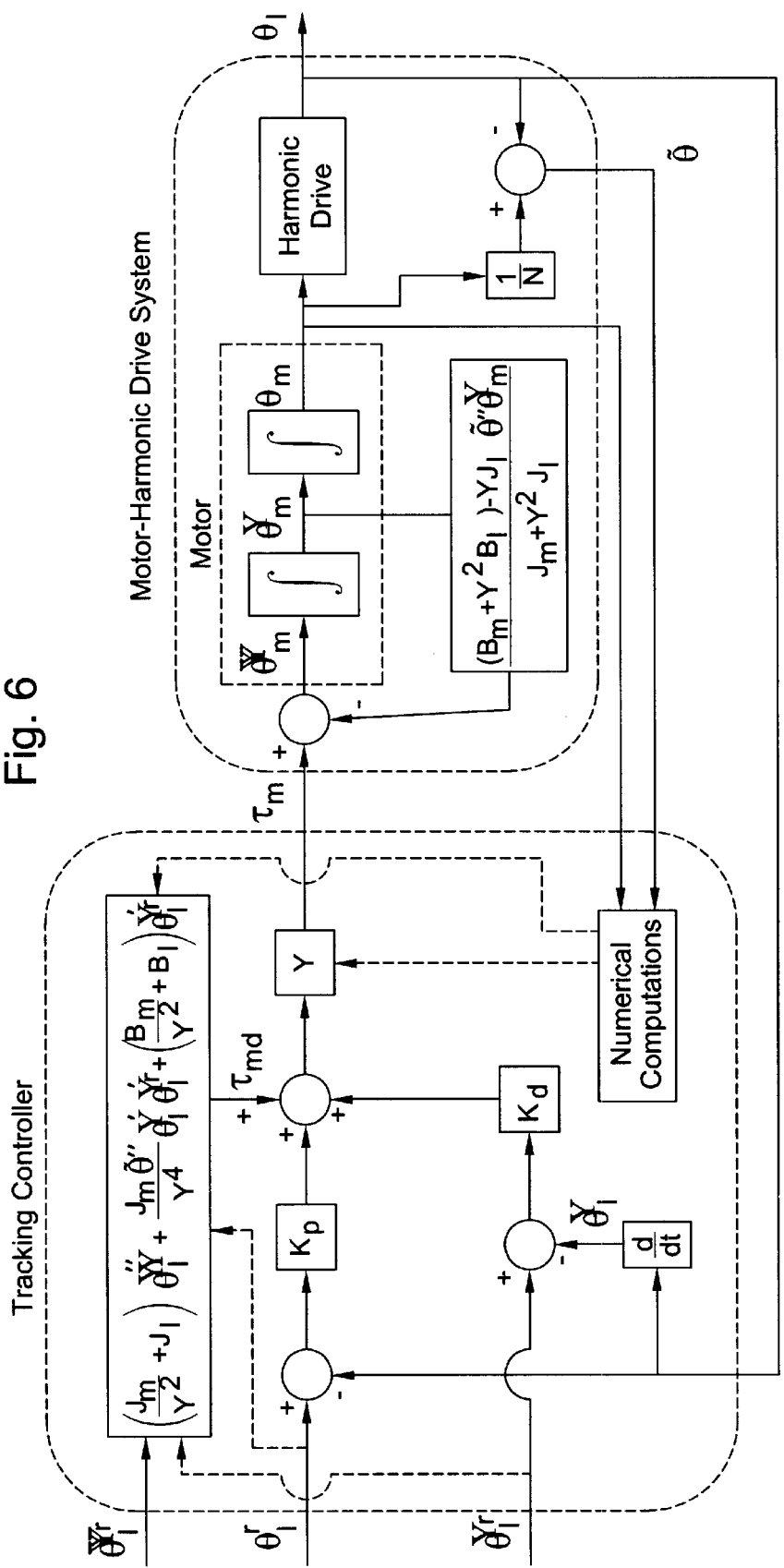

The discussion below presents the mathematical aspects of the control mechanisms of the present invention. FIGS. 5 and 6 are schematic diagrams of control systems for set-point control and tracking control, respectively, of harmonic drive systems. The variables discussed below and their usage in the present control schemes are schematically illustrated.

Figure 7:
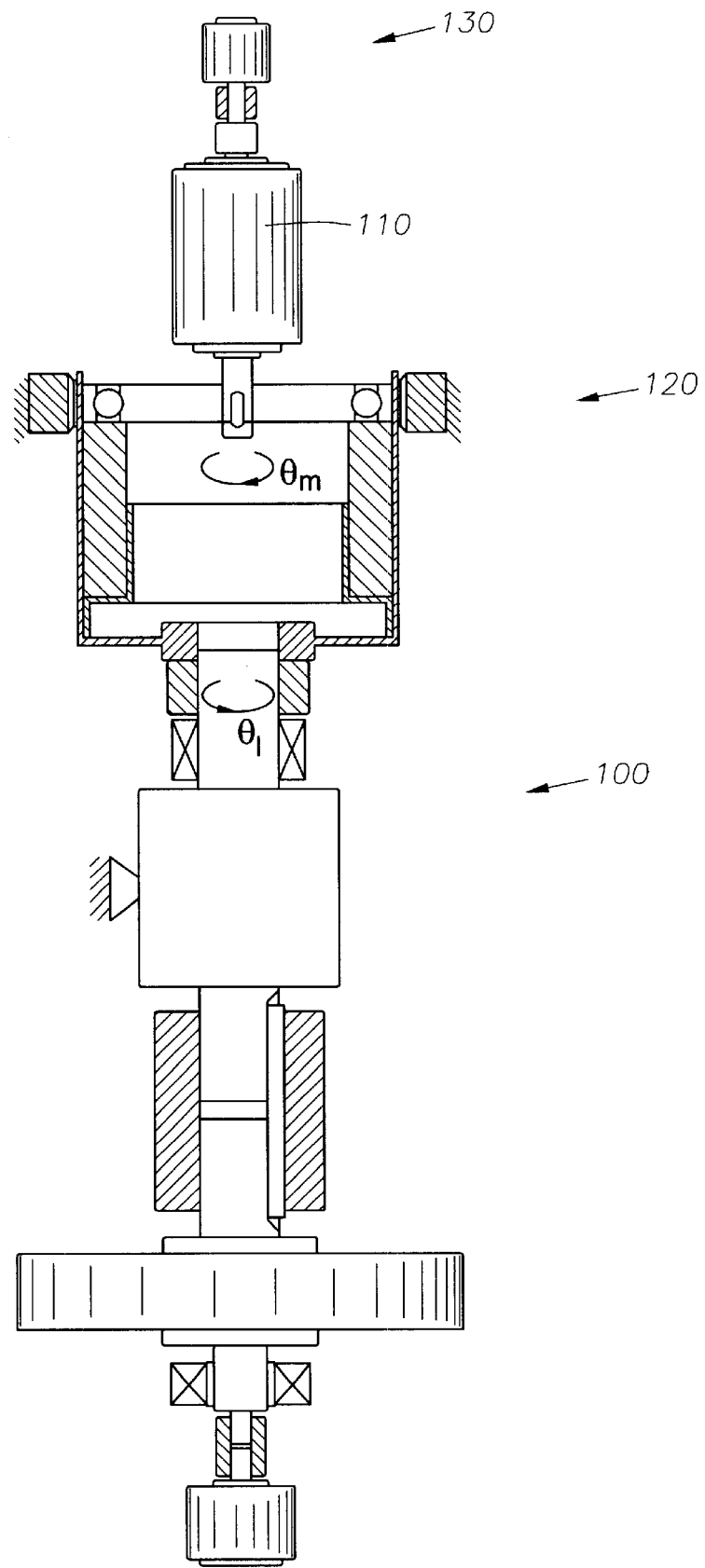
FIG. 7 is a schematic diagram of an experimental setup.

FIG. 7 shows a schematic diagram of a harmonic drive test setup. The diagram shows all the parameters of the system; Table 1 lists their values. These values are obtained experimentally using standard system identification techniques and are further verified using manufacturers' data. Note that the torque sensor shown in the figure is not used for the purpose of this work.

TABLE 1

System Parameters Used for Simulation

| Parameter | Symbol | Numerical Value |
| --- | --- | --- |
| Inertia on Motor Side | $J_m$ | $4.5 \times 10^{-4}$ kgm² |
| Inertia on Load Side | $J_l$ | $5.0 \times 10^{-2}$ kgm² |
| Damping on Motor Side | $B_m$ | $3.3 \times 10^{-3}$ Nm-s |
| Damping on Load Side | $B_l$ | $5.0 \times 10^{-4}$ Nm-s |
| Gear Ratio | N | 50 |

Considering the assumptions mentioned above, the kinetic energy T of the system and the Rayleigh function D for energy dissipation are given, respectively, by $$T = \tfrac{1}{2} J_m \dot{\theta}_m^2 + \tfrac{1}{2} J_l \dot{\theta}_l^2. \tag{3a}$$

$$D = \tfrac{1}{2} B_m \dot{\theta}_m^2 + \tfrac{1}{2} B_l \dot{\theta}_l^2. \tag{3a}$$

The two variables, namely motor position $\theta_m$ and load position $\theta_l$ in equations (3a) and 3(b) above, are constrained by equation (1), which defines the kinematic error $\theta_k = \theta_k(\theta_m)$. Thus the system has only one degree of freedom, expressed in terms of either the motor variable $\theta_m$ or the load variable $\theta_l$. By rearranging equation (1), we get $$\theta_l = \theta_m/N - \theta_k \tag{4}$$

Differentiating this equation with respect to time yields $$\dot{\theta}_l = \gamma \dot{\theta}_m. \tag{5}$$

where $$Y = Y(\theta_m) = \frac{1}{N} - \frac{d\tilde{\theta}}{d\theta_m} \quad (6)$$

The variable $Y(\theta_m)$ can be interpreted as a new gear transmission ratio that depends on the motor position $\theta_m$ due to the effects of kinematic error. Using Equation (5) to define the relationship between motor velocity and load velocity, the kinetic energy T and the Rayleigh energy D can be represented either in terms of motor variables or in terms of load variables. Differentiating Equation (6) with respect to time, we get $$\dot{Y} = \tilde{\theta}''\dot{\theta}_m \quad (7)$$

where $$\tilde{\theta}'' = -\frac{d}{d\theta_m}\left(\frac{d\tilde{\theta}}{d\theta_m}\right) \quad (8)$$

Representing T and D in terms of $\dot{\theta}_m$ for Lagrange formulation with $\theta_l$ as an independent variable and using equations (6) and (7), we get a single second order nonlinear differential equation governing the system dynamics in terms of load variables ($\theta_l$, $\dot{\theta}_l$, $\ddot{\theta}_l$) as $$\left(\frac{J_m}{Y^2} + J_l\right)\ddot{\theta}_l + \frac{J_m\tilde{\theta}''}{Y^4}\dot{\theta}_l^2 + \left(\frac{B_m}{Y^2} + B_l\right)\dot{\theta}_l = \frac{\tau_m}{Y}. \quad (9)$$

The nonlinearity in the system is represented in the nonlinear functions Y and $\theta_k''$.

Representing T and D in terms of $\dot{\theta}_m$ for Lagrange formulation with $\dot{\theta}_m$ as an independent variable, we get a similar second order differential equation governing the same dynamics in terms of motor variables ($\theta_m$, $\dot{\theta}_m$, $\ddot{\theta}_m$) as $$(J_m + Y^2 J_l)\ddot{\theta}_m - YJ_l\tilde{\theta}''\dot{\theta}_m^2 + (B_m + Y^2 B_l)\dot{\theta}_m = \tau_m. \quad (10)$$

We use equation (9) for the purpose of stability analysis presented below and equation (10) for the purpose of simulation. From equation (9) we observe that when the quantity $Y(\theta_m)=0$, the system becomes singular. However, considering the form of kinematic error, we conclude that $Y(\theta_m)$ can not be zero for any $\theta_m$ and any drive. Next, we state and prove the property of the dynamic model represented by equation (9).

In reference to equation (9), let $D(\theta_l)=(J_m)/(Y^2)+J_l$, and $C(\theta_l)=[(J_m\theta_k'')/(Y^4)]\dot{\theta}_l$, then D−2C is zero.

By differentiating D with respect to time, we get $$\dot{D} = \frac{-2J_m}{Y^3}\dot{Y}. \quad (11)$$

Now, from equation (7) and equation (4) it follows that $$\dot{D} = \frac{2J_m\tilde{\theta}''}{Y^4}\dot{\theta}_l = 2C. \quad (12)$$

This property will be used later for the Lyapunov stability analysis of the controllers.

To carry out simulations using Equation (9) or (10), we need the kinematic error profile $\theta_k(\theta_m)$ and its two successive derivatives with respect to $\theta_m$. This requires that the discrete experimental data for $\theta_k$ be represented in a continuous and at least twice differentiable function of $\theta_m$. This can be achieved by first representing the discrete data in the form of a piece-wise continuous curve and then using a projection of this curve onto the finite dimensional basis of Fourier eigenfunctions. In other words, we use the best approximation of the experimental profile in the subspace spanned by a finite number (in this case 16) of Fourier eigenfunctions. The profile is thus represented by $$\tilde{\theta} = \frac{a_0}{2} + \sum_{n=1}^{k} [a_n\cos(n\theta_m) + b_n\sin(n\theta_m)] \text{ where} \quad \text{Eq 12(13)}$$

$$a_n = \frac{1}{\pi}\int_0^{2\pi} \tilde{\theta}(\theta_m)\cos(n\theta_m)\,d\theta_m, \text{ and} \quad \text{eq 13(14a)}$$

$$b_n = \frac{1}{\pi}\int_0^{2\pi} \tilde{\theta}(\theta_m)\sin(n\theta_m)\,d\theta_m. \quad (14b)$$

The Fourier coefficients ($a_n$, $b_n$) are obtained by using numerical integration techniques and linear interpolation of the data.

Set-point Control

This section sets out set-point and trajectory tracking control strategies that compensate for the kinematic error in order to achieve high precision positioning. Based on the model dynamics derived previously, this section develops a control law to compensate for kinematic error in a set-point control of load position. The asymptotic stability in compensation can be proved using the Lyapunov stability theory, as set out in the Appendix.

Figure 8:
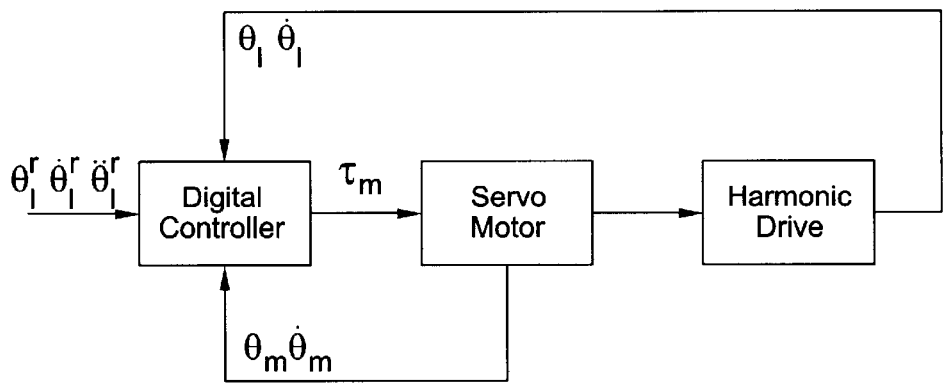
FIG. 8 is a schematic diagram of one feature of the present invention.

Let the set-point control problem consist of driving the load shaft position $\theta_l$ to a constant reference position $\theta_{l,r}$. Let both motor and load state feedback be available as shown in FIG. 8. Note that $\dot{\theta}_{l,r}$ and $\ddot{\theta}_{l,r}$ are zero since $\theta_{l,r}$ is constant. In this setting, we have discovered a set-point control strategy for driving the load position $\theta_l$ to the reference position $\theta_{l,r}$, thereby compensating completely for the kinematic error. Specifically, this can be accomplished by using the following equation to calculate the control input, $\tau_m$:

$$\tau_m = Y(\theta_m)(K_p\theta_l^e - K_d\dot{\theta}_l), \quad (15)$$

where $K_p$ and $K_d$ are positive constants, and $\theta_{l,e}$ is defined as $\theta_{l,r}-\theta_l$. The load will be driven to the reference position $\theta_{l,r}$ such that $(\theta_{l,r}-\theta_l)\to 0$ and $\dot{\theta}_l\to 0$ as $t\to\infty$, for all kinematic error profiles $\theta_k(\theta_m)$.

Note that the control algorithm does not contain an acceleration term.

Tracking Control

This section focuses on trajectory tracking with harmonic drives using a nonlinear computed torque and PD-type controller derived above to compensate for kinematic error and sets out a control strategy for tracking the load position along a desired trajectory. With this novel control algorithm, as in the case of set-point control, the tracking error asymptotically approaches zero irrespective of the profile of the kinematic error. To start, we assume that the load position is to track a reference trajectory $\theta_{l,r}(t)$. Let $\theta_{l,r}(t)$ be a twice differentiable function of time t. Furthermore, let both motor and load state feedbacks be available, as shown, for example, in FIG. 8. In this setting, the following trajectory tracking control algorithm can be used to calculate the control input, $\tau_m$:

$$\tau_m = Y(\theta_m)(\tau_{md} + K_p\theta_l^e - K_d\dot{\theta}_l^e), \quad (16a)$$

and $$\tau_{md} = \left(\frac{J_m}{Y^2} + J_l\right)\ddot{\theta}_l^r + \frac{J_m\tilde{\theta}''}{Y^4}\dot{\theta}_l\dot{\theta}_l^r + \left(\frac{B_m}{Y^2} + B_l\right) \quad (16b)$$

where $K_p$ and $K_d$ are positive constants, and $\theta_{l,e}$ is defined as $\theta_{l,r}(t)-\theta_l$. The load will be driven to the reference tracking trajectory such that $(\theta_{l,r}(t)-\theta_l) \to 0$ and $(\dot{\theta}_{l,r}(t)-\dot{\theta}_l) \to 0$ as $t \to \infty$, for all kinematic error profiles $\theta_k(\theta_m)$. Hence, the equilibrium e=0 is asymptotically stable, and the controller achieves successful tracking irrespective of the profile of kinematic error. Proof of this algorithm is set out in the Appendix.

Simulation and Experimental Results

The control algorithms described above can be implemented in simulation using the ordinary differential equation solver in MATLAB. The experimental implementation is carried out using a dedicated harmonic drive test setup depicted in FIG. 7. Specifically, the experimental system 100 comprises a servo motor 110, a harmonic drive module 120 (HDC-40 manufactured by Harmonic Drive Technologies of Peabody Mass.), and a digital control module 130. Digital control module 130 has an electromechanical interface with the harmonic drive module so as to acquire system information using various sensors (not shown). In particular, the motor position is monitored by a rotary encoder (resolution= 0.045°), the load position is measured by a laser rotary encoder (resolution=0.0018°), and the load torque is measured with a DC operated non-contact rotating torque sensor (Note that torque sensor is not used for the purpose of this work). As it can be seen, the experimental system was operated in the vertical plane.

Experimental Implementation

The experimental implementation of the control schemes presented above does not require any prior information regarding the profile of the kinematic error $\theta_k$. All the required terms in the control law are computed on-line. This section deals with different issues involved in these computations.

Computation of Y

Digital implementation of Y can be realized using a causal approximation of derivative terms in equation (5). Thus, $$Y = \frac{d\theta_l/dt}{d\theta_m/dt} = \frac{d\theta_l}{d\theta_m} \approx \frac{\Delta\theta_l}{\Delta\theta_m}, \quad (17)$$

where the operator $\Delta$ represents the difference between the value of variable at a given sampling instant and that at a previous sampling instant. As $\Delta\theta_m$ 43 0, equation (17) indicates a possible singularity. The following analysis implements the computation devoid of singularity. The variational analysis of equation (1) shows that $$d\tilde{\theta} = \frac{d\theta_m}{N} - d\theta_l. \quad (18)$$

Dividing the equation by $d\theta_m$, rearranging the terms, and taking limit as $d\theta_m$ 43 0 on both sides, gives $$\lim_{d\theta_m \to 0} Y = \lim_{d\theta_m \to 0} \frac{d\theta_l}{d\theta_m} = \frac{1}{N} - \lim_{d\theta_m \to 0} \frac{d\tilde{\theta}}{d\theta_m}. \quad (19)$$

The term $d\theta_k/d\theta_m$ represents the slope of the kinematic error curve. As $d\theta_m$ 43 0, this term tends to be constant at a given motor position $\theta_m$. Hence as $d\theta_m$ 43 0, it follows from Equation (19) that Y tends to remain constant at whatever value it has at that position. This constant value can not be equal to 1/N as per the property B1 (see Appendix). With this understanding, the computation of Y is implemented devoid of singularity.

Another issue in computing Y is that the numerical approximation of a derivative induces unnecessary high frequency components. To reduce these high frequency components and to reduce further the error in computation of $\theta_k''$, Y is filtered using a suitable second order low pass filter.

Computation of $\theta_k''$

From equation (6), we can get $d\theta_k/d\theta_m$ as $$\tilde{\theta}' = \frac{d\tilde{\theta}}{d\theta_m} = \frac{1}{N} - Y, \quad (20)$$

where Y is computed as in the previous section. Next, we can represent $\theta_k''$ using a similar causal approximation of derivative as $$\tilde{\theta}'' \approx \frac{\Delta\tilde{\theta}'}{\Delta\theta_m}. \quad (21)$$

This formula can be used to compute the second derivative $\theta_k''$. Again, we may expect a singularity as $\Delta\theta_m \to 0$. As in the previous case, the singularity can be avoided by obtaining the value of $\theta_k''$ in the limiting case as $\Delta\theta_m \to 0$, or equivalently as $d\theta_m \to 0$. Analysis in the previous case indicates that $\theta_k' = d\theta_k/d\theta_m$ tends to be a constant as $d\theta_m \to 0$. In the similar manner, $\theta_k''$, which represents the slope of $\theta_k'$ curve tends to remain constant as $d\theta_m \to 0$. In this case again, to remove the high frequency components induced by the approximation of derivative, the signal $\theta_k''$ is filtered using a second order low pass filter.

Compensation for Friction

The friction in the drive is not considered in the mathematical model. Hence the experimental conditions are tailored to suit the model. A static Coulomb friction model for compensation is assumed and unidirectional motion is maintained to avoid dynamic friction effects. The control input is modified based on the Coulomb model used for compensating friction:

$$u = \tau_m + F_f, \quad (22)$$

where $F_f$ represents the Coulomb friction term. This friction is identified based on simple experiments. To realize the unidirectional motion in the set-point and trajectory tracking experiments, the gain parameters $K_p$ and $K_d$ are chosen to avoid overshoot. Also, in tracking experiments, the reference trajectory is chosen such that the reference velocity does not change sign, thereby ensuring unidirectional motion for purposes of analysis.

Set-point Control Results

Figure 9:
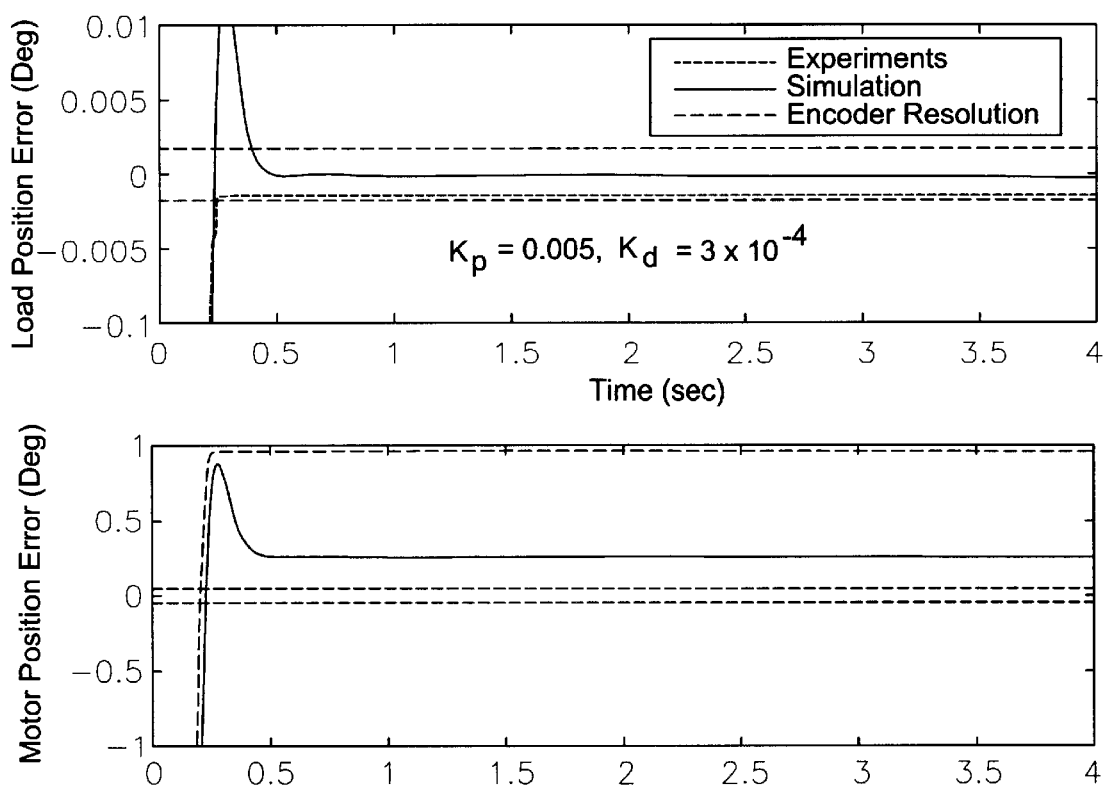
FIG. 9 is two plots of errors in set-point control of load position output of a harmonic drive constructed in accordance with the present invention.

FIG. 9 presents the simulation and experimental error history in an exemplary implementation of the set-point control strategy. It was observed that the load position error $(\theta_l - \theta_{l,r})$ finally goes to zero in simulation and to a point within the encoder resolution in experiments. Thus, a successful compensation of kinematic error in set-point control of harmonic drive is achieved.

In the steady state, the observation of motor position error (computed as $\theta_m - \theta_{l,r}N$) shows a constant error that corresponds to the kinematic error at the final motor position. The final kinematic error can have different value in simulation and experiments. This is because the kinematic error profile used in simulation may differ from that in the experiments due to its dependence on different factors mentioned above. Also, a phase lag between the two profiles can be another source of this difference. From the final shift in the motor position, we conclude that the controller dynamically adjusts the motor position so as to make the load position error-free. In this way, the controller achieves the complete compensation for the error. Close observation of the results shows that there is an overshoot in the results of simulation but not in those of experiments for the same gain values. This can be attributed to the dynamic friction effects which become dominant near zero velocities.

Tracking Control Results

FIG. 10 shows the simulation and experimental steady state results when the load position tracks a trajectory defined by $\theta_{l,r}(t)=2 \sin(\pi t/2)+10t$. The gain values used in tracking are also listed in FIG. 10. Note that the trajectory is chosen to have a unidirectional motion to avoid dynamic friction effects, and lower velocities are used to minimize the unmodeled flexibility effects. We observe that the load position error again goes to zero in simulation. Experimental results show approximately 40 percent reduction in load position error. FIG. 11 illustrates this reduction in tracking error as compared to the kinematic error produced in the absence of the controller. Thus, successful tracking of load position is achieved within the experimental constraints.

The small amplitude high frequency discrepancy in the experimental results can be attributed to unmodeled flexibility effects and the error in the computation of numerical derivative $\theta_k''$. Again, the Coulomb friction model which was assumed to represent the friction in the drive may not be rich enough for the purpose of complete friction compensation. The motor position error profile in FIG. 10 shows the reflected kinematic error both in simulation and experiments. Thus, the tracking controller also adjusts the motor position dynamically so as to make the load position error-free.

CONCLUSION

This work presents nonlinear control algorithms for closed loop compensation for kinematic error in set-point and trajectory tracking with harmonic drives. Using the Lyapunov stability theory, it has been shown that the steady state error in the load position can be driven to zero with these algorithms. Furthermore, these algorithms do not require any information regarding the nonlinear, drive-specific kinematic error profile. The experimental and the simulation results verify the effectiveness of these algorithms. Thus these profile-independent algorithms can compensate for the kinematic error in harmonic drives under varying operating conditions and, hence, are useful for applications involving precision control of harmonic drives.

Mathematical Preliminaries
Notations $L_\infty^n = \{f: R_+ \to R^n$ such that f is Lebesgue measurable and $\|f\|_\infty < \infty\}$, $L_2^n = \{f: R_+ \to R^n$ such that f is Lebesgue measurable and $\|f\|_2 < \infty\}$, where $\|f\|_\infty$ and $\|f\|_2$ are given by $\|f\|_\infty = \text{ess sup } \|f(t)\|$, $t \in [0, \infty)$, $\|f\|_2 = \{\int_0^\infty \|f(t)\|^2 \, dt\}^{1/2}$.

Corollary of Barbalat Lemma [ ]

If $f(t)$, $[f\dot{}](t) \in L_\infty^n$ and $f(t) \in L_2^n$, then $f(t) \to 0$ as $t \to \infty$.

What is claimed is:

1. A method for tracking control of kinematic error in a harmonic drive system having a motor side and a load side, comprising:

calculating a control input, $\tau_m$, for the harmonic drive using the equation where $$\tau_m = Y(\theta_m)(\tau_{md} + K_p \theta_l^e - K_d \dot{\theta}_l^e),$$

and $\tau_{md} = \left(\frac{J_m}{Y^2} + J_l\right)\ddot{\theta}_l^r + \frac{J_m \overline{\ddot{\theta}}}{Y^4}\dot{\theta}_l \dot{\theta}_l^r + \left(\frac{B_m}{Y^2} + B_l\right)$ where Y is a nonlinear function of kinematic error, $K_p$ and $K_d$ are positive constants, $\theta_m$ is the motor position of the harmonic drive, $\theta_l^e$ is the error defined as $\theta_{l,r} - \theta_l$, where $\theta_l$ is the load position and $\theta_{l,r}$ is the desired load angle, $\dot{\theta}_l^e = d\theta_l^e/dt$, $\ddot{\theta}_l^e = d^2\theta_l^e/dt^2$, $\dot{\theta}_l^r = d\theta_l^r/dt$, $J_m$ is inertia on the motor side, $J_l$ is inertia on the load side, $B_m$ is damping on the motor side, and $B_l$ is damping on the load side.

2. The method according to claim 1 wherein Y is calculated according to the following equation:

$$Y = \frac{1}{N} - \frac{d\tilde{\theta}}{d\theta_m}.$$

3. The method according to claim 2, wherein Y is filtered using a second order low pass filter.

4. The method according to claim 1 wherein Y is calculated according to the following equation:

$$Y = \frac{d\theta_l}{d\theta_m}.$$

5. The method according to claim 1 wherein Y is calculated according to the following equation:

$$Y = \frac{\Delta\theta_l}{\Delta\theta_m}.$$

6. A method for set point control of kinematic error in a set-point in a harmonic drive system having a motor side and a load side, comprising:

calculating a control input, $\tau_m$, for the harmonic drive using the equation $$\tau_m = Y(\theta_m)(K_p \theta_l^e - K_d \dot{\theta}_l),$$

where Y is a nonlinear function of the kinematic error, $K_p$ and $K_d$ are positive constants, $\theta_m$ is the motor position of the harmonic drive, $\theta_l^e$ is the error defined as $\theta_{l,r} - \theta_l$, where $\theta_l$ is the load position and $\theta_{l,r}$ is the desired load angle, and $\dot{\theta}_l = d\theta_l/dt$.

7. The method according to claim 6 wherein Y is calculated according to the following equation:

$$Y = \frac{1}{N} - \frac{d\tilde{\theta}}{d\theta_m}.$$

8. The method according to claim 7, wherein Y is filtered using a second order low pass filter.

9. The method according to claim 6 wherein Y is calculated according to the following equation:

$$Y = \frac{d\theta_l}{d\theta_m}.$$

10. The method according to claim 6 wherein Y is calculated according to the following equation:

$$Y = \frac{\Delta\theta_l}{\Delta\theta_m}.$$

* * * * *